United States Patent [19]

Furusawa et al.

[11] Patent Number: 5,017,311
[45] Date of Patent: May 21, 1991

[54] METHOD FOR INJECTION MOLDING INTO A RESONATING MOLD

[75] Inventors: Toshihiro Furusawa; Atsushi Satoh, both of Sodegaura; Takashi Nakajima; Noriaki Matsugishi, both of Tokyo, all of Japan

[73] Assignees: Idemitsu Kosan Co., Ltd.; Seidensha Electronics Co., Ltd., both of Tokyo, Japan

[21] Appl. No.: 381,054

[22] Filed: Jul. 17, 1989

[30] Foreign Application Priority Data

Jul. 21, 1988 [JP] Japan ............................. 63-180238
Mar. 16, 1989 [JP] Japan ................................. 1-62196

[51] Int. Cl.$^5$ ............................................. B29C 45/00
[52] U.S. Cl. ....................................... 264/23; 264/71; 264/328.1
[58] Field of Search ................... 264/22, 23, 69, 71, 264/72, 328.1; 425/174.2

[56] References Cited

U.S. PATENT DOCUMENTS

| 4,140,744 | 2/1979 | Karas et al. | 264/72 |
| 4,339,303 | 7/1982 | Frisch et al. | 264/22 |
| 4,500,280 | 2/1985 | Astier et al. | 425/174.2 |
| 4,780,255 | 10/1988 | Depcik et al. | 264/26 |

Primary Examiner—Jill L. Heitbrink
Attorney, Agent, or Firm—Hidaka and Benman

[57] ABSTRACT

An injection molding method in which a molding material is injected into a cavity formed in a mold to be molded. The mold is driven to resonate so that resonance occurs in the mold at n wavelengths, where $n = m/2$ and m is a positive integer, and an injection molding apparatus provided with a fixed mold and a movable mold; the movable mold having a cavity in one side thereof, and an ultrasonic vibration feed device being connected to the other side thereof.

4 Claims, 4 Drawing Sheets

METHOD FOR INJECTION MOLDING INTO A RESONATING MOLD

BACKGROUND OF THE INVENTION

1. Field of the Invention

This invention relates to a method and apparatus for injection molding by which a molding material, such as a macromolecular material, is formed into products having superior physical properties and a good appearance.

2. Description of the Related Art

Injection molding methods are widely used for processing a molding material which consists of or mainly includes a thermoplastic resin, as these methods have the advantage of a high productivity.

Recently, as a result of research into the physical properties of thermoplastic resins, it was found that the rigidity, heat-resistance and chemical properties of molded products are influenced by the molecular weight of the molding material, i.e., the thermoplastic resin.

The molecular weight of the thermoplastic resin which can be used in a conventional injection molding method, however, is relatively low, i.e., is lower than the molecular weight of the thermoplastic resin to be formed into a film, and therefore, the conventional injection molding method has a problem in that the physical properties such as rigidity, heat-resistance, and chemical properties of the molded products are unsatisfactory.

As means for improving these physical properties, several injection molding methods have been proposed by which the apparent fluidity of the resin is improved to increase the molecular weight thereof.

Japanese Examined Patent Publication No. 57-2088 proposed a method in which a gate of a mold is subjected to ultrasonic vibration. This method, however, has a problem in that the mold has a complex construction, and that the mold and the devices associated therewith are damaged by the ultrasonic vibration.

Japanese Unexamined Patent Publication No. 61-44616 proposed a method in which the surface of the mold is heated by induction heating under a high-frequency electromagnetic field, but as a result of experiments using this method, it was found that, even if the surface of the mold is heated, the expected improvement of the apparent fluidity of the resin is not obtained.

On the other hand, when a macromolecular material is used in injection molding, the material is heated while being fed into the mold. In this process, the material is thermally expanded by the heating process and then shrunk while in the mold in a cooling process, and thus only products having a size smaller than the size of the cavity of the mold can be obtained. Accordingly, to improve the dimensional accuracy of the molded products, several methods have been proposed for reducing the shrinkage of the molding material fed into the mold.

For example, it has been proposed that the injection molding pressure and clamping force be made much higher to enable a lowering of the processing temperature. This method, however, has a problem in that flaws occur in the molded product, and thus it is easily deformed in shape when used.

Japanese Unexamined Patent Publication No. 58-134722 proposed a method whereby the cavity to which the molding material is fed is formed by a horn for generating ultrasonic vibration, to thereby prevent fluctuations of the temperature of the material during the cooling process. This method, however, has a problem in that since the molding material is directly in contact with the horn, the load on the horn and a vibrator is too high, and thus it is difficult to transmit a required ultrasonic vibration to the molding material.

SUMMARY OF THE INVENTION

Therefore, an object of the present invention is to provide an injection molding method by which a remarkable improvement of the apparent fluidity of the molding material is obtained.

Another object of the present invention is to provide an injection molding method by which shrinkage of the molded products is reduced.

A further object of the present invention is to provide an injection molding apparatus capable of carrying out the above injection molding method and having a relatively simple construction.

In accordance with the present invention, the mold used in the injection molding is resonated the ultrasonic vibration such that the resonance in the mold occurs at n wavelengths, where $n = m/2$ and m is a positive integer. Also, in accordance with the present invention, the injection molding apparatus comprises a fixed mold and a movable mold capable of being moved against and a part from the fixed mold, and an ultrasonic vibration feeding device connected to the movable mold on a surface thereof opposite to a cavity or cavities formed in the movable mold.

Other objects and features of the present invention will be apparent from the following description.

DESCRIPTION OF THE PREFERRED EMBODIMENTS

Figure 1:
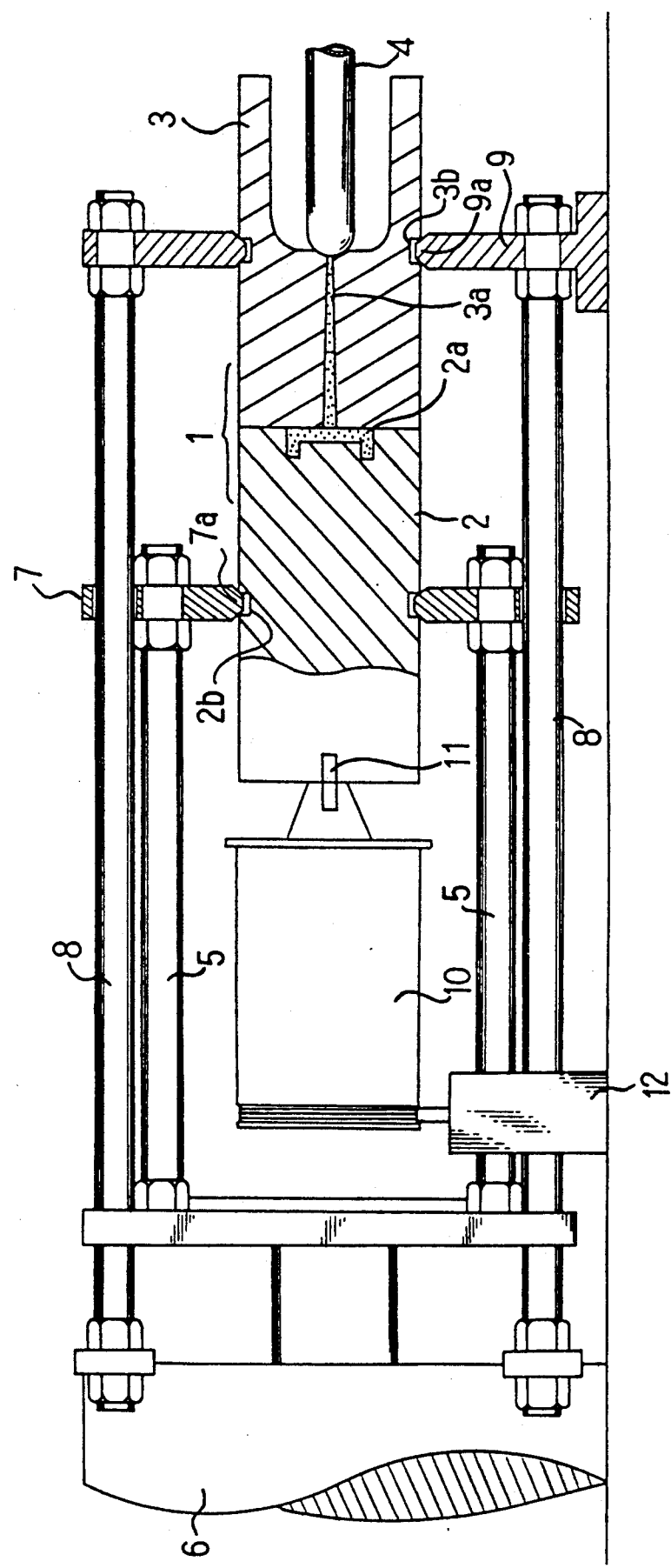
FIG. 1 is a partially sectional view of an embodiment of an injection molding apparatus according to the present invention.
Figure 2:
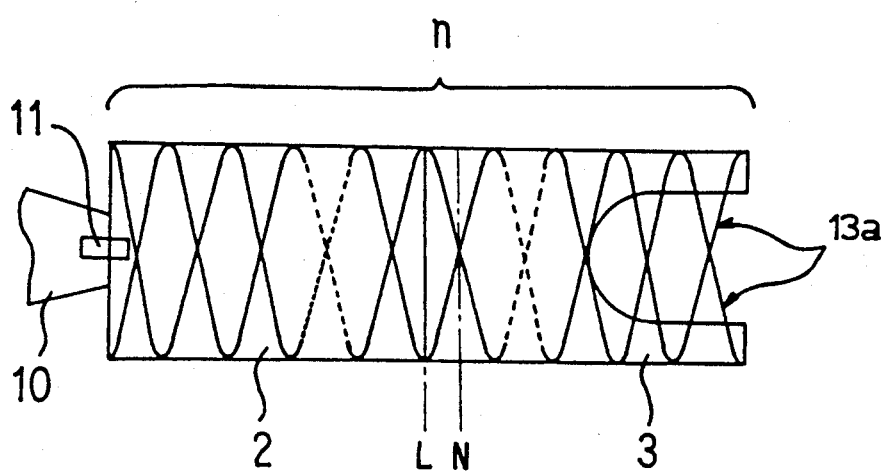
FIG. 2 and FIG. 3 are views illustrating a displacement wave and wavelength of a resonating mold.
Figure 3:
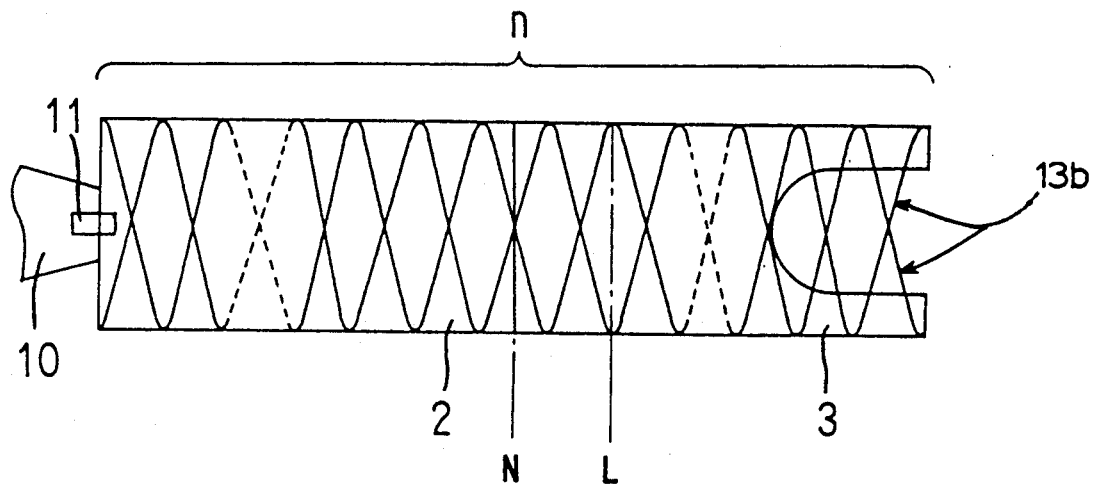

Referring first to an embodiment of an injection molding apparatus shown in FIG. 1, molds 1 consist of a movable mold 2 and a fixed mold 3. A cavity 2a is formed in the movable mold 2 at the surface thereof facing the fixed mold 3, and a sprue 3a is located in the fixed mold 3 and in communication with the cavity 2a. The molds 1 may be made of metal, ceramic or graphite, etc., or may be made of other materials capable of reducing ultrasonic vibration transfer loss and fatigue thereof during high amplitude ultrasonic vibration, such as a titanium alloy or duralumin.

The molds 1 may be coated with a coating material or subjected to an embossing process, and may be composed of three or more molds. In this case, the position at which each mold is in surface-to-surface contact with each other is preferably located as near as possible to loop portions (shown by "L" in FIGS. 2, 3, 5 and 8) of the molds, i.e., portions at which a displacement wave (shown by 13a, 13b, 13c and 13d in FIGS. 2, 3, 5 and 8, respectively) of ultrasonic vibration has the widest amplitude, to enable a good vibration transfer between the molds.

The thermal control of the molds and the removal of molded products from the molds by pins are carried out by well known methods. Joint members for supplying or discharging thermal control mediums to and from the molds therethrough are preferably disposed on the molds at positions near node portions (shown by "N" in FIGS. 2, 3, 5 and 8) of the molds, i.e., cross points of the displacement waves of the ultrasonic vibration. The clearance between the pins and bores through which the pins pass is preferably as small as possible at positions near node portions.

A nozzle 4 of a injection machine (not shown) injects and supplies a molding material into the cavity 2a through the sprue 3a. The connection point between the sprue 3a and the nozzle 4 is located near the node portion of the fixed mold 3, which is resonated.

First holding members 5 are fixed to a cylinder 6 so as to move forward (to the right in the figure) and backward (to the left in the figure) against the cylinder, and a holding plate 7 is fixed on top of each holding member 5, to hold the movable mold 2 under pressure against the fixed mold 3. The holding plate 7 supports the peripheral surface of the movable mold 2 approximately at the center, i.e., near the node portion, with respect to the longitudinal direction thereof. The peripheral surface of the movable mold 2 is provided with a groove 2b, into which tapering tips 7a of the holding plate 7 are inserted and engaged therewith, whereby the holding plate 7 is held in line contact, not surface-to-surface contact, with the movable mold 2, to thereby greatly reduce the area of contact between the movable mold 2 and the holding plate 7. As a result, a transmission of vibration from the movable mold 2 through the holding plate 7 is prevented, and thus the devices associated with the molds 1 are not subjected to undesirable vibration.

Second holding members 8 are fixed to the casing of the cylinder 6, and holding plate 9 is fixed to the top of each of the second holding members 8. The holding plate 9 supports the fixed mold 3 approximately at the center thereof, i.e., near the node portion. Therefore as in the movable mold 2, the holding plate 9 and the fixed mold 3 are held in line contact with each other by engaging the tapering tips 9a of the holding plate 9 with the groove 3b of the fixed mold 3.

As described above, preferably the molds 1 and holding plates 7 and 9 are held in contact with each other at a minimal area and contact portions therebetween are located near node portions of the molds 1, and thus, the transmission of ultrasonic vibration from the molds 1 is prevented.

A transducer 10 is placed in pressure contact with the movable mold 2 through the end surface thereof opposite to the surface having the cavity 2a, and is connected thereto by a connecting member 11 such as a screw. An ultrasonic generator 12 generates ultrasonic vibration of the transducer 10 to cause a resonation of the molds 1, i.e., the movable mold 2 and the fixed mold 3.

The resonance frequency of the molds is held within a range at which the ultrasonic generator 12 can run. Therefore, if a fluctuation of the resonance frequency occurs due to a fluctuation of a load imposed on the molds 1, while the molding material is fed from the nozzle 4 into the cavity 2a through the sprue 3a, the resonation of the molds 1 is constantly maintained at a desired value. Further, even if a fluctuation of the load imposed on the molds occurs, the electric power supply to the ultrasonic generator 12 is controlled accordingly.

Examples of injection molding methods carried out by using the above injection molding apparatus will now be described.

The nozzle 4 of the material injecting apparatus (not shown) is brought into pressure contact with the sprue 3a in the fixed mold 3, through which the molding material is injected and fed into the cavity 2a. At the same time, the transducer 10 is driven by the ultrasonic generator 12 to thereby resonate the molds 1 so that the resonance in the molds 1 occurs at n wavelengths, where $n = m/2$ and m is a positive integer (refer to FIG. 2).

The frequency of the vibration of the molds 1 is preferably from 1 KHz to 10 MHz, more preferably from 10 KHz to 100 KHz, to ensure an efficient application of the ultrasonic vibration to the molding material in the molds 1. The amplitude of the ultrasonic vibration is preferably of the highest value at which the molding material is vibrated within the limits imposed by the fatigue property of the molds 1.

Here, n is preferably less than three (i.e., $n < 3$), to reduce the number of node portions in the molds 1 and ensure that the node portions are easily coincided with support points of the molds 1 by the holding plates 7 and 9 or the contact points between the nozzle 4 and the fixed mold 3.

Where n is less than 3 (i.e., $n < 3$) the cavity 2a is preferably matched with one of the loop portions in the molds 1. Accordingly, since the cavity 2a and the molding material therein are subjected to the heaviest vibration, the contact resistance between the molding material and the wall surface of the cavity 2a is reduced, and thus a high apparent fluidity of the molding material is obtained.

Instead of matching the cavity 2a with one of the loop portions in the molds 1, the cavity 2a may be matched with one of the node portions in the molds 1. Generally, a phenomena is known whereby any material in contact with a member under ultrasonic vibration is drawn to the node portions of the member; this is usually known as an ultrasonic stress effect. When the cavity 2a is coincided with one of the node portions of the molds 1, the stress effect ensures a proper supply of the molding material into the cavity 2a, whereby a reduction of the size of the molded products is almost eliminated.

As an example of the molding material able to be used in the above injection molding method and apparatus, there can be mentioned a material having at least a slight fluidity during an injection molding process, for example, organic materials such as a plastic, an inorganic polymer material, a ceramic, a metal, an inorganic material such as glass and food, and mixtures thereof.

The injection molding method according to the present invention includes a multi-color molding method, a compressive injection molding method and the like, and further, includes all molding methods which comprise the steps of injecting under pressure a molding material in a fluid state or in a rubbery condition into molds, processing the molding material into a desired shape in the molds, and removing the molded product from the molds.

Hereafter, experiments carried out by the present inventors utilizing the above injection molding method and apparatus will be described in comparison to comparative examples.

EXPERIMENT 1

Figure 4:
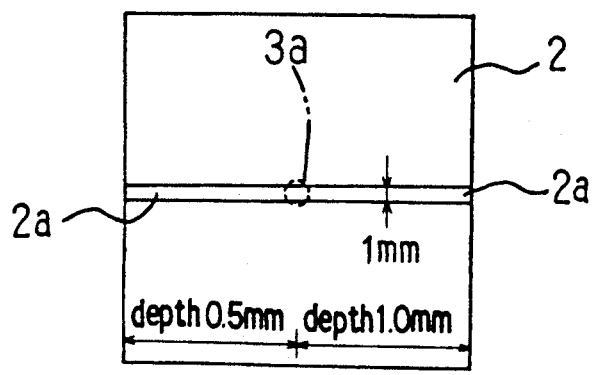
FIG. 4 is a view of a cavity used during injection molding experiments conducted according to the present invention.
Figure 5:
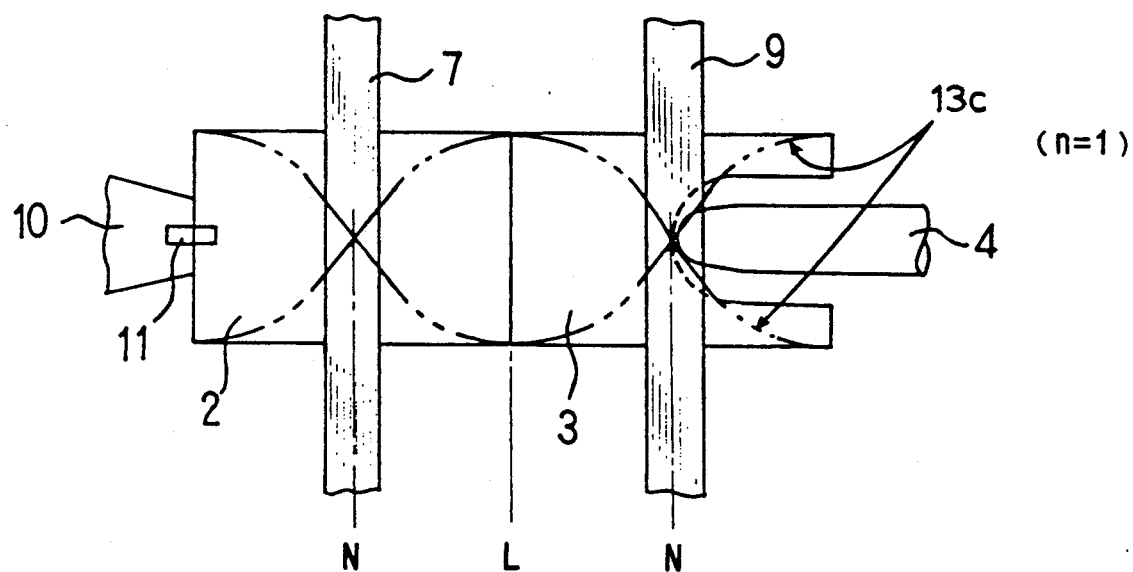
FIG. 5 is a side view of molds illustrating conditions under which the injection molding was carried out according to an experiment 1.

Injection molding apparatus: Apparatus shown in FIG. 1 Molding material: Polyethylene (640 UF IDEMITSU PETROCHEMICAL CO., LTD.)
Molds:
  Shape: Square pillar having a section of 60 mm×60 mm
  Material: Structural steel (JIS S45C)
  As shown in FIG. 4, a cavity 2a in the form of a linear groove is formed in the movable mold 2. The cavity 2a on the left side of a sprue 3a has a depth of 0.5 mm, and the cavity 2a on the right side of the sprue 3a has a depth of 1 mm. And those grooves have a width of 1 mm.
Ultrasonic generator: Generator having a basic frequency of 19.15 KHz (SONOPET 1200-B SEIDENSHA ELECTRONICS CO., LTD.)
Molding conditions:
  Clamping pressure: 3.5 ton
  Injection pressure: 940 kg/cm$^2$
  Temperature of molding material: 142~144° C.
  Amplitude of vibration: 5 μm
  Resonance: As shown in FIG. 5, resonance occurs in the molds 1 at one wavelength.

The injection molding was carried out under the above conditions while the molds were resonated. Then the flow length of the molding material fed to the cavity 2a having a width of 0.5 mm was measured ten times, and an average thereof calculated. Table 1 shows the results of experiment 1.

COMPARATIVE EXAMPLE 1

Experiments were carried out under the same conditions as those of Experiment 1, except that the molds were not subjected to ultrasonic resonation. The generator is turned off.

COMPARATIVE EXAMPLE 2

Experiments were carried out under the same conditions as those of Comparative Example 1, after the molds were heated to 200° C. by a far infrared ray heater. This method is considered to be the same as a conventional method in which the injection molding is carried out after the surface temperature of the molds are raised by a high-frequency induction heating apparatus.

COMPARATIVE EXAMPLE 3

Figure 6:
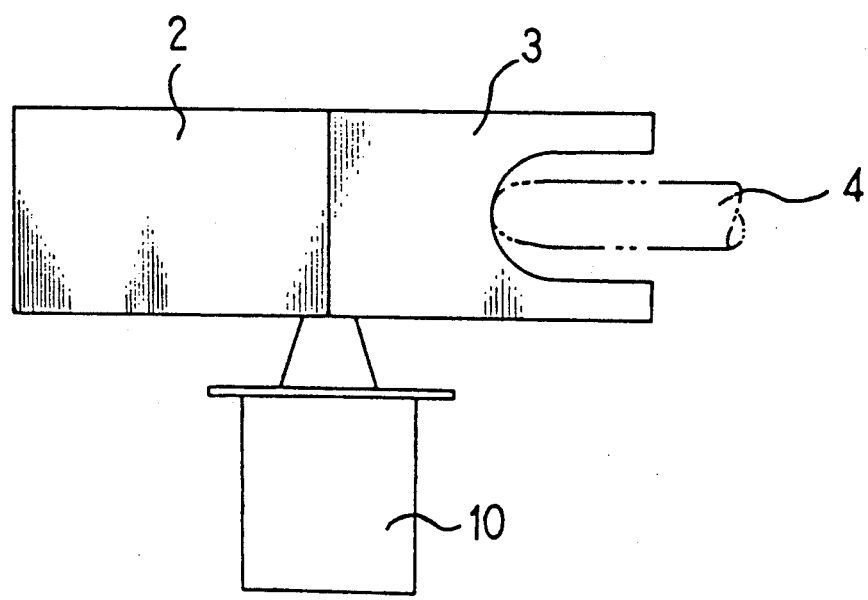
FIG. 6 is a schematic view of an embodiment of an injection molding apparatus out of accordance with the present invention.

Experiments were carried out under the same conditions as those in Experiment 1, except that the transducer 10 was located at a position at which the movable mold 2 and the fixed mold 3 were in contact with each other, as shown in FIG. 6. The molds 2 and 3 were vibrated but not resonated. Table 1 shows the results of the Experiment 1 and Comparative Examples 1, 2 and 3.

TABLE 1

| | Temperature of molds [°C.] | Flow length [mm] |
|---|---|---|
| Experiment 1 | 30 | 9.1 (0.17) |
| Comparative Example 1 | 30 | 3.0 (0.18) |
| Comparative Example 2 | 200 | 3.7 (0.26) |
| Comparative Example 3 | 30 | 3.4 (0.53) |

Note: Flow length is shown by standard deviation in parentheses.

As clearly understood from Table 1, the present invention (i.e., experiment 1) provides a greatly improved the apparent fluidity of the molding material compared to a case in which the molds were not driven for vibration (Comparative Example 1), the molds were driven for vibration but were not resonated (Comparative Example 3), or the molds were heated (Comparative Example 2).

EXPERIMENT 2

Figure 7:
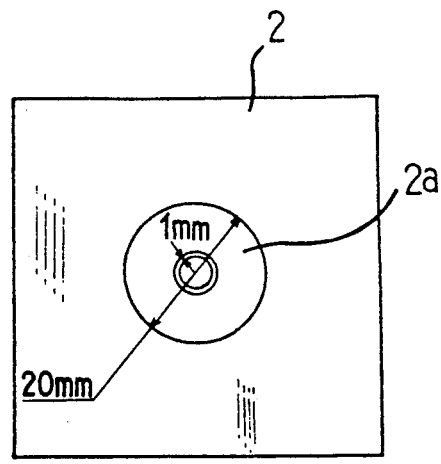
FIG. 7 is a view of a cavity used during injection molding conducted according to the present invention as an experiment 2.
Figure 8:
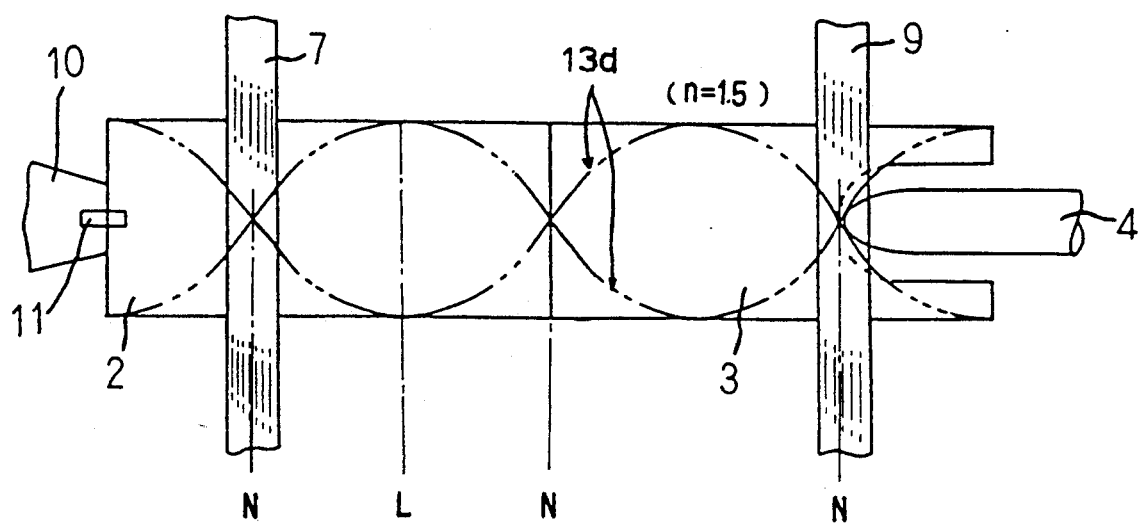
FIG. 8 is a side view of molds illustrating conditions under which the injection molding was carried out according to the experiment 2.

Injection molding apparatus: The same apparatus as shown in FIG. 1, except that the fixed mold and the movable mold were slightly longer.
Molding material:
  Polypropylene (J-700G IDEMITSU PETROCHEMICAL CO., LTD.)
Molds:
  Shape: Square pillar having a section of 60 mm×60 mm
  Material: Titanium alloy (6A1-4 V)
  As shown in FIG. 7, a cavity 2a in the form of a circular groove is formed in the movable mold 2. The cavity 2a has a depth of 1 mm and a diameter of 20 mm, and the gate has a width of 1 mm.
Ultrasonic generator:
  Generator having a basic frequency of 19.15 KHz (SONOPET 1200-B SEIDENSHA ELECTRONICS CO., LTD.)
Molding conditions:
  Clamping pressure: 3.5 ton
  Injection pressure: 940 kg/cm$^2$
  Temperature of molding material: 220° C.
  Amplitude of vibration: 33 μm
  Resonance: As shown in FIG. 8, resonance occurs in the molds 1 at a 1.5 wavelength.

The injection molding was carried out under the above conditions while the molds were resonated. Then the diameters of 10 molded products were measured and an average thereof calculated. Table 2 shows the results of experiment 2.

COMPARATIVE EXAMPLE 4

Experiments were carried out under the same conditions as those of Example 2, except that the molds were not subjected to ultrasonic resonation. The generator is turned off.

COMPARATIVE EXAMPLE 5

Experiments were carried out under the same conditions as in Experiment 2, except that the transducer 10 was located at a position at which the movable mold 2 and the fixed mold 3 were in contact with each other, as shown in FIG. 6. Table 2 shows the results of Experiment 2 and Comparative Examples 4 and 5.

TABLE 2

|  | Diameter of molded product (mm) |
| --- | --- |
| Experiment 2 | 19.91 |
| Comparative Example 4 | 19.74 |
| Comparative Example 5 | 19.76 |

As clearly understood from Table 2, the present invention (i.e., Experiment 2) produced molded products in which a reduction in the size thereof was greatly decreased, compared to a case in which the molds are not driven for vibration (Comparative Example 4), and the molds are driven for vibration but not resonated (Comparative Example 5).

EXPERIMENT 3

Experiments were carried out under the same conditions as in Experiment 1, expect that the molds were supported by holding plates in line contact therewith. Then a load current in the ultrasonic generator was measured. Table 3 shows the results of Experiment 3.

COMPARATIVE EXAMPLE 6

Experiments were carried out under the same conditions as those of Comparative Example 3, except that the molds, i.e., the movable mold and the fixed mold, were supported by holding plates having supporting tips with a shape coinciding with grooves on both molds. In this case, the molds and the holding plates are brought into contact with each other in a surface-to-surface contact. Table 3 also shows the results Experiment 3 and Comparative Example 6.

TABLE 3

|  | Load current in oscillator [A] | Remarks |
| --- | --- | --- |
| Experiment 3 | 1.4 | Usual vibration occurred. |
| Comparative Example 6 | 7.2 | Vibration was accompanied by noise |

It is understood from Table 3 that, due to the rise in the load current in Comparative Example 6, in which the molds were in surface-to-surface contact with the holding plates, vibration was transmitted from the molds through the holding plates, and as a result, preferably that the molds are supported by holding plates in line contact therewith.

As mentioned above, since the molds are subjected to ultrasonic resonation during the injection molding, vibration is efficiently transmitted to the molds and the molding material therein, and therefore, the apparent fluidity of the molding material is improved, whereby materials not capable of being molded by conventional molding methods, such as a high molecular weight plastic and composite materials containing many fillers, are easily molded. Further, it is possible to greatly decrease any reduction of the size of the molded products.

We claim:

1. An injection molding method in which a molding material is injected into a cavity in a mold, the mold having opposite sides comprising a step of resonating the mold so that a resonance wave measured from one opposite side to the other opposite side has n wavelengths, where $n = m/2$ and m is a positive integer.

2. An injection molding method as claimed in claim 1 wherein said cavity is located near a loop portion of said resonance wave in said mold.

3. An injection molding method as claimed in claim 1, wherein said cavity is located near a node portion of said resonance wave in said mold.

4. An injection molding method as claimed in claim 1, 2 or 3, wherein said mold is composed of a fixed mold and a movable mold, said fixed mold and said movable mold are respectively supported by holding members, and said mold is resonated so that points supported by said holding members are located near node portions of said resonance wave in said mold.

* * * * *